United States Patent
Lipworth et al.

(10) Patent No.: US 10,075,219 B1
(45) Date of Patent: Sep. 11, 2018

(54) ADMITTANCE MATRIX CALIBRATION FOR TUNABLE METAMATERIAL SYSTEMS

(71) Applicant: Elwha LLC, Bellevue, WA (US)

(72) Inventors: Guy Shlomo Lipworth, Seattle, WA (US); Yaroslav A. Urzhumov, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 15/592,084

(22) Filed: May 10, 2017

(51) Int. Cl.
| | |
|---|---|
| H04B 3/46 | (2015.01) |
| H04B 7/04 | (2017.01) |
| H04B 7/0456 | (2017.01) |
| H01Q 1/36 | (2006.01) |
| H01Q 21/06 | (2006.01) |
| H01Q 3/22 | (2006.01) |

(52) U.S. Cl.
CPC .............. *H04B 7/046* (2013.01); *H01Q 1/36* (2013.01); *H01Q 21/065* (2013.01); *H01Q 3/22* (2013.01)

(58) Field of Classification Search
CPC ........ H01Q 15/0086; H01Q 3/26; H03H 7/40; H04B 1/0458
See application file for complete search history.

(56) References Cited

U.S. PATENT DOCUMENTS

| | | |
|---|---|---|
| 6,492,942 B1 | 12/2002 | Kezys |
| 7,256,753 B2 | 8/2007 | Werner et al. |
| 8,040,586 B2 | 10/2011 | Smith |
| 8,471,776 B2 | 6/2013 | Das |
| 8,776,002 B2 | 7/2014 | Formato |
| 8,848,295 B2 | 9/2014 | Smith et al. |
| 2003/0048223 A1 | 3/2003 | Kezys |
| 2010/0156573 A1 | 6/2010 | Smith |
| 2012/0041699 A1 | 2/2012 | Sestok |
| 2012/0194399 A1 | 8/2012 | Bily |
| 2013/0040593 A1 | 2/2013 | Sestok |

(Continued)

OTHER PUBLICATIONS

Schurig et al., "Metamaterial Electromagnetic Cloak at Microwave Frequencies", Sciencexpress Report, Oct. 19, 2006, www.sciencexpress.org.

(Continued)

*Primary Examiner* — Ross E Varndell

(57) ABSTRACT

The present disclosure provides system and methods for calibrating a tunable metamaterial device. A sequence of port impedance vectors, ($z^{(m)}$, m), may be generated. Each of the port impedance vectors may be applied to the tunable metamaterial device, and measuring at least one S-parameter. A simulated S-Matrix may be generated by associating each of the port impedance vectors, $z^{(m)}$, with the unknown admittance matrix. The unknown admittance matrix may be solved for by determining a plurality of optimization variables by comparing each of the S-parameters, $S^{(m)}$, to the simulated S-Matrix for each port impedance vector, $z^{(m)}$, and generating an estimated admittance matrix by associating each of the optimization variables with the unknown admittance parameters. The estimated admittance matrix may be used for more accurate radiation patterning.

41 Claims, 11 Drawing Sheets

(56) References Cited

U.S. PATENT DOCUMENTS

| | | | |
|---|---|---|---|
| 2014/0340278 A1 | 11/2014 | Formato | |
| 2015/0078485 A1* | 3/2015 | Broyde | H04B 1/0458 |
| | | | 375/297 |
| 2017/0069966 A1* | 3/2017 | Black | H01Q 3/26 |

OTHER PUBLICATIONS

Hunt et al., "Metamaterial Apertures for Computational Imaging" with "Supplementary Materials for Metamaterial for Apertures Computational Imaging", Science, Jan. 18, 2013, vol. 339 www.sciencemag.org.

Smith et al., "Gradient Index Metamaterials", Physical Review E 71, The American Physical Society, Mar. 17, 2005.

Pendry et al., "Extremely Low Frequency Plasmons in Metallic Mesostructures", Physical Review Letters, Jun. 17, 1996, pp. 4773-4776, vol. 76, No. 25.

Shalaev, Vladimir M., "Optical Negative-Index Metamaterials", Nature Photonics, Jan. 2007, vol. 1, Nature Publishing Group.

Pendry et al., "Magnetism from Conductors and Enhanced Nonlinear Phenomena", IEEE Transactions on Microwave Theory and Techniques, Nov. 1999, vol. 47, No. 11.

Pendry et al., "Controlling Electromagnetic Fields", Science, Jun. 23, 2006, pp. 1780-1782, vol. 312, www.sciencemag.org.

Shelby et al., "Experimental Verification of a Negative Index of Refraction", Science, Apr. 6, 2001, pp. 77-79, vol. 292, www.sciencemag.org.

Driscoll et al., Performance of a three dimensional transformation-optical-flattened Luneburg lens, Optics Express, Jun. 4, 2012, vol. 20 No. 12, Optical Society of America.

Larouche et al., Nanotube holograms, Nature, Nov. 1, 2012, pp. 47-48, vol. 491, Macmillan Publishers Limited.

Landy et al., A full-parameter unidirectional metamaterial cloak for microwaves, Nature Materials, Nov. 11, 2012, pp. 1-4, Macmillan Publishers Limited.

Hunt et al., Broadband Wide Angle Lens Implemented with Dielectric Metamaterials, www.mdpi.comijournal/sensors, Aug. 12, 2011, pp. 7982-7991.

Larouche et al., Infrared metamaterial phase holograms, Nature Materials, Mar. 18, 2012, pp. 450-454, vol. 11.

Hunt et al., Planar, flattened Luneburg lens at infrared wavelengths, Optics Express, Jan. 16, 2012, pp. 1706-1713, vol. 20 No. 2, Optical Society of America.

Urzhumov et al., Thin low-loss dielectric coatings for free-space cloaking, Optics Letters, May 15, 2013, pp. 1606-1608, vol. 38 No. 10, Optical Society of America.

Urzhumov et al., Low-loss directional cloaks without superluminal velocity or magnetic response, Optics Letters, Nov. 1, 2012, pp. 4471-4473, vol. 37 No. 21, Optical Society of America.

Ni et al., Metasurface holograms for visible light, Nature Communications, Nov. 15, 2013, pp. 1-6, Macmillan Publishers Limited.

Leon-Saval et al., Mode-selective photonic lanterns for space-division multiplexing, Optics Express, Jan. 13, 2014, pp. 1-9, vol. 22 No. 1, Optical Society of America.

Lalau-Keraly et al., Adjoint shape optimization applied to electromagnetic design, Optics Express, Sep. 9, 2013, pp. 21693-21701, vol. 21 No. 18, Optical Society of America.

Lin et al., Nanostructured Holograms for Broadband Manipulation of Vector Beams, Nano Letters, Aug. 5, 2013, pp. 4269-4274, American Chemical Society.

Jin et al., Advances in Particle Swarm Optimization for Antenna Designs: Real-Number, Binary, Single-Objective and Multiobjective Implementations, IEEE Transactions on Antennas and Propagation, Mar. 2007, pp. 556-567, vol. 55 No. 3, IEEE.

Zhu et al., Design and Optimization of Low Rcs Patch Antennas Based on a Genetic Algorithm, Progress in Electromagnetics Research, 2012, pp. 327-339, vol. 122.

Wu et al., Design Synthesis of Metasurfaces for Broadband Hybrid-Mode Horn Antennas With Enhanced Radiation Pattern and Polarization Characteristics, IEEE Transactions on Antennas and Propagation, Aug. 2012, pp. 3594-3604, vol. 60 No. 8, IEEE.

Boeringer et al., Efficiency-Constrained Particle Swarm Optimization of a Modified Bernstein Polynomial for Conformal Array Excitation Amplitude Synthesis, IEEE Transactions on Antennas and Propagation, Aug. 2005, pp. 2662-2673, vol. 53 No. 8, IEEE.

Yu et al., Flat optics with designer metasurfaces, Nature Materials, Jan. 23, 2014, pp. 139-150, vol. 13, Macmillan Publishers Limited.

Jensen et al., Topology optimization for nano-photonics, Laser Photonics, 2011, pp. 308-321, Rev 5 No. 2, Wiley-Vhe Verleg GmbH & Co.

Orihara et al., Optimization and application of hybrid-level binary zone plates, Applied Optics, Nov. 10, 2001, pp. 5877-5885, vol. 40 No. 32, Optical Society of America.

Seliger et al., Optimization of aperiodic dielectric structures, http://dx.doi.orq/10.1063/12221497, Aug. 8, 2006, visited Aug. 11, 2014.

Toader et al., Photonic Band Gap Architectures for Holographic Lithography, Physical Review Letters, Jan. 30, 2004, pp. 1-4, vol. 92 No. 4, The American Physical Society.

Sharp et al., Photonic crystals for the visible spectrum by holographic lithography, Optical and Quantum Electronics 34, 2002, pp. 3-12, Kluwer Academic Publishers.

Fong et al., Scalar and Tensor Holographic Artificial Impedance Surfaces, IEEE Transactions on Antennas and Propagation, Oct. 2010, pp. 3212-3221, vol. 58 No. 10, IEEE.

Kildishev et al., Planar Photonics with Metasurfaces, Science 339, http://www.sciencemaq orgicontenti339/612511232009,full.htm, Mar. 15, 2013, visited Oct. 8, 2014.

Saravanamuttu et al., Sol-Gel Organic-Inorganic Composites for 3-D Holographic Lithography of Photonic Crystals with Submicron Periodicity, American Chemical Society, Apr. 29, 2003, 4 pgs.

Bayraktar et al., The Design of Miniature Three-Element Stochastic Yagi-Uda Arrays Using Particle Swarm Optimization, IEEE Antennas and Wireless Propagation Letters, Nov. 22, 2005, pp. 22-26, IEEE.

Miller, Photonic Design: From Fundamental Solar Cell Physics to Computational Inverse Design, Thesis, Spring 2012, pp. 137.

Huang et al., Three-dimensional optical holography using a plasmonic metasurface, Nature Communications, Nov. 15, 2013, pp. 1-8, Macmillan Publishers Limited.

Yu et al., Topology optimization for highly-efficient light-trapping structure in solar cells, Research paper, May 10, 2014, pp. 367-382, Springer-Verlag Berlin Heidelberg 2014.

PCT International Search Report; International App. No. PCT/US2016/049965; dated Dec. 8, 2016; pp. 1-3.

N. Kundtz & D. Smith, "Extreme-Angle Broadband Metamaterial Len," Nature Mat. 9, p. 129 (2010).

D. Smith, Y. Urzumov et al., "Enhancing imaging systems using transformation optics" Optics Express 18, 21238 (2010).

* cited by examiner

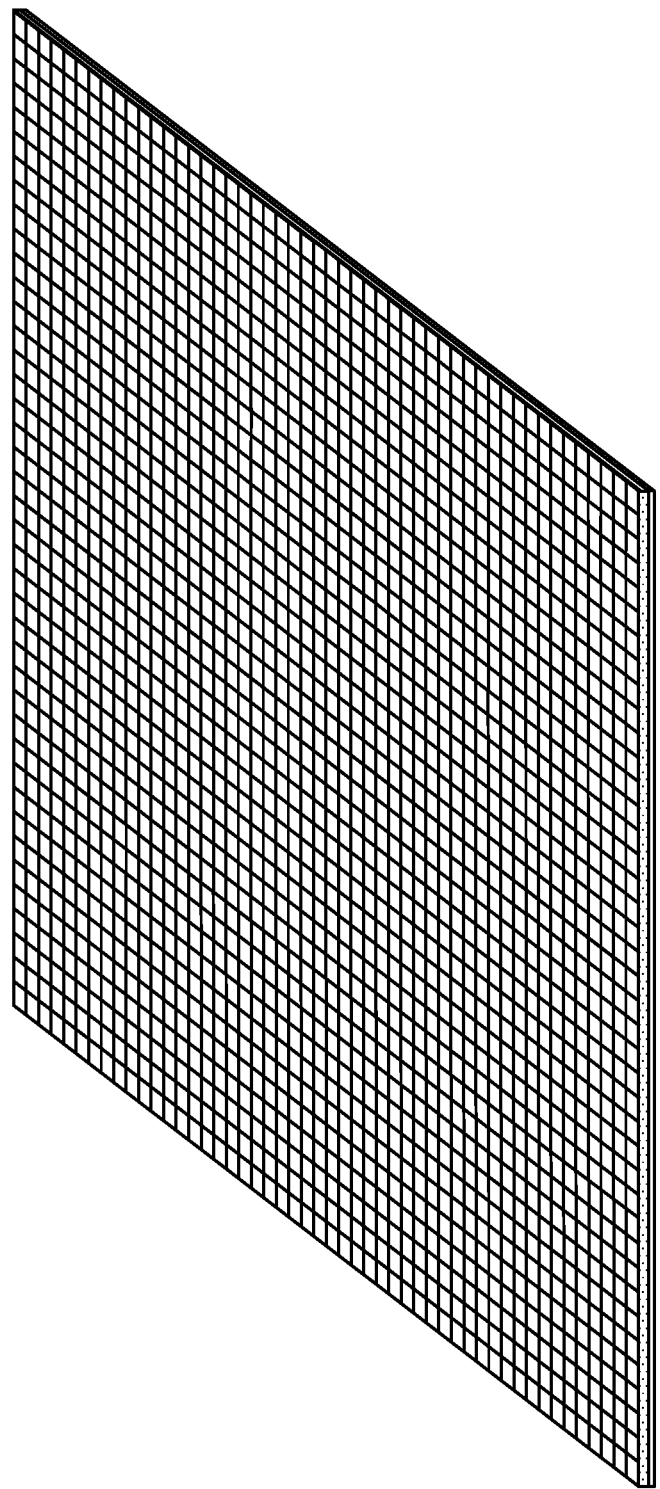

700

Assign hierarchy tiers to admittance matrix variables based on distance from a diagonal
710

Calculate a first subset of the least-squares optimization variables associated with the first tier
720

Calculate a second subset of least-squares optimization variables associated with a second tier
730

Determine if the comparison reaches a target tolerance
740

```
┌─────────────────────────────────────────┐
│ Generate a specially-selected sequence  │
│           of impedance vectors          │
│                   810                   │
└─────────────────────────────────────────┘
                    │
                    ▼
┌─────────────────────────────────────────┐
│ Obtain S-parameters of a scattering     │
│      matrix, for each port              │
│          impedance vectors              │
│                   820                   │
└─────────────────────────────────────────┘
                    │
                    ▼
┌─────────────────────────────────────────┐
│       Generate a simulated S-matrix     │
│                   830                   │
└─────────────────────────────────────────┘
                    │
                    ▼
┌─────────────────────────────────────────┐
│  Determine a plurality of optimization  │
│               variables                 │
│                   840                   │
└─────────────────────────────────────────┘
                    │
                    ▼
┌─────────────────────────────────────────┐
│ Generate an estimated admittance matrix │
│       with the optimization variables   │
│                   850                   │
└─────────────────────────────────────────┘
```

FIG. 8

ADMITTANCE MATRIX CALIBRATION FOR TUNABLE METAMATERIAL SYSTEMS

If an Application Data Sheet (ADS) has been filed on the filing date of this application, it is incorporated by reference herein. Any applications claimed on the ADS for priority under 35 U.S.C. § 119, 120, 121, or 365(c), and any and all parent, grandparent, great-grandparent, etc., applications of such applications are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc., applications of the Priority Application(s)). In addition, the present application is related to the "Related Applications," if any, listed below.

PRIORITY APPLICATIONS

None

RELATED APPLICATIONS

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

This disclosure relates to tunable metamaterial devices and the optimization of variable impedance elements to attain target radiation and/or field patterns.

BRIEF DESCRIPTION OF THE DRAWINGS

FIG. 1 illustrates an antenna system comprising an array of sub-wavelength antenna elements, according to one simplified embodiment.

FIG. 7 is a flow chart of a method for accelerating the estimation of an admittance matrix of a tunable antenna using tiered matrices, according to one embodiment.

FIG. 8 is a flow chart of a method for accelerating the estimation of an admittance matrix of a tunable antenna using specially selected impedance vectors, according to one embodiment.

DETAILED DESCRIPTION

Figure 2A:
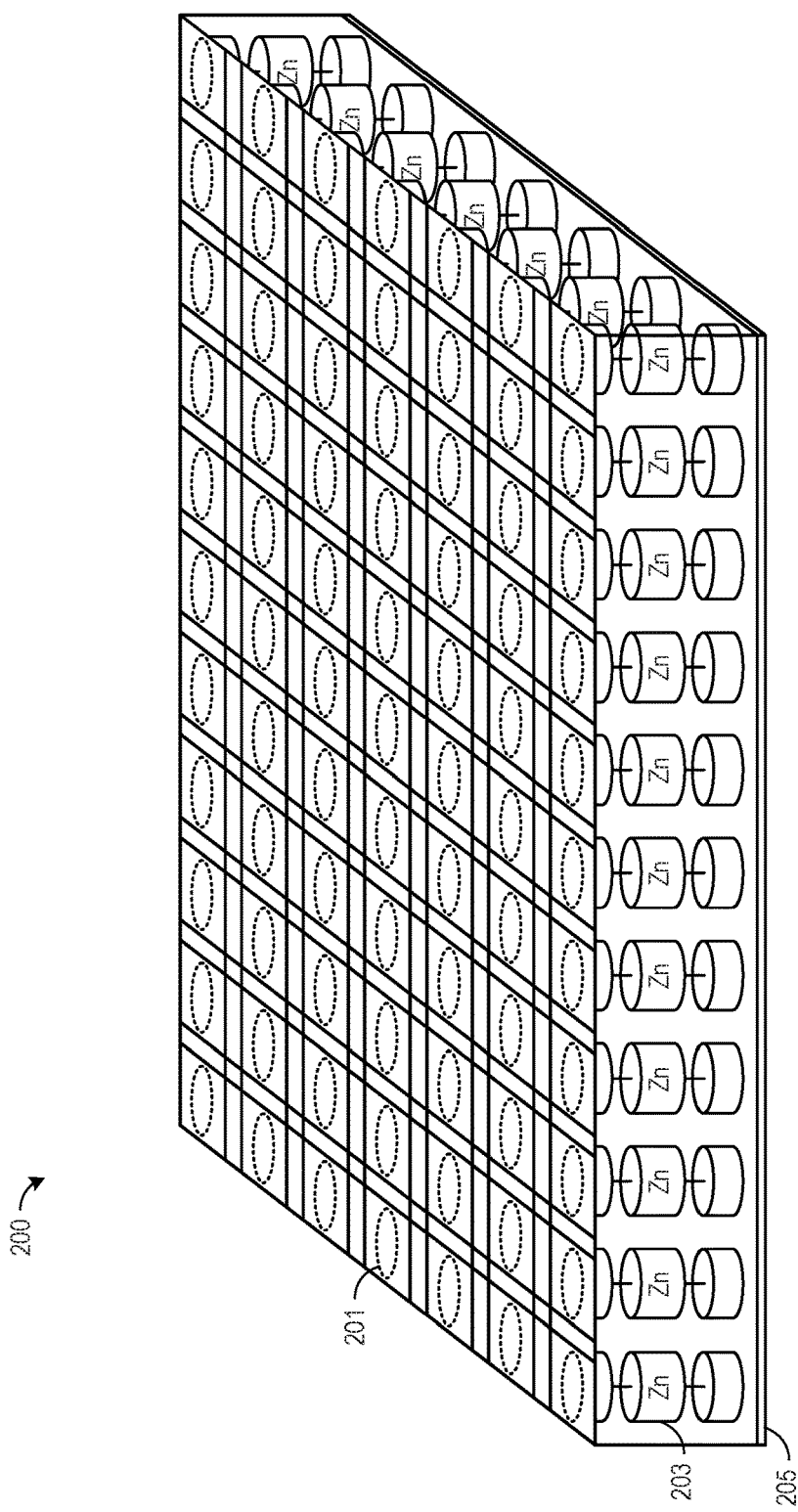
FIG. 2A illustrates a close-up view of a section of an array of sub-wavelength antenna elements with associated variable impedance elements, according to one simplified embodiment.

Various embodiments, systems, apparatuses, and methods are described herein that relate to radiation and electromagnetic field patterning for communication, wireless power transfer, and other uses. Tunable metamaterial devices may be used to solve various electromagnetic field-based issues. By tuning individual elements of a densely packed metamaterial array, a wide variety of customizable radiation patterns may be attained. In many instances of this disclosure, metamaterial elements are used as example embodiments of sub-wavelength antenna elements. It is, however, appreciated that any of a wide variety of sub-wavelength antenna elements may be utilized that may or may not be classified as metamaterials.

Tunable metamaterial devices have been proposed for a variety of devices, ranging from beamforming antennas to linear precoders (spatial multiplexers), and radio frequency imaging systems. Efficient operation of such devices relies on optimizing spatial modulation patterns created by the tunable metamaterial array of sub-wavelength antenna elements. For example, a highly efficient method to optimize spatial modulation patterning uses a virtual port network to describe signal propagation through the tunable metamaterial. However, this and other optimizing techniques rely on the knowledge of an admittance matrix (Y) or impedance matrix (Z) of a tunable metamaterial device.

While these matrices can be predicted through numerical simulations of the device, their actual values may differ from the predicted values. For example, during the design phase, simulations of an antenna system are performed. The simulations produce predicted performance values of the antenna system, such as the admittance matrix and impedance matrix. However, implementing the design often leads to various imperfections that are not accounted for during the design phase. For example, the manufacturing and installation of the antenna system may result in an antenna system with an altered admittance matrix. The manufacturing and/or installation may affect each antenna system in a unique manner. Thus, it is difficult to perfectly simulate the antenna system and predict the admittance matrix and impedance matrix of an antenna system with an array of tunable metamaterial antenna elements.

Systems and methods described herein estimate an admittance matrix of an antenna system with an array of tunable metamaterial antenna elements using actual measurements. Because an impedance matrix is the inverse of the admittance matrix, the systems and methods disclosed herein also apply to estimating the impedance matrix. Because the admittance and impedance matrices are estimated using actual measurements, the estimations may be more accurate than the matrices predicted by the simulation.

For example, calibration systems and methods for estimating an admittance matrix of a tunable antenna system may generate a sequence of port impedance vectors, ($z^{(m)}$, m). Each port impedance vector, $z^{(m)}$, of the sequence has a length, N, and corresponds to a set of impedance values for a plurality of tunable impedance elements in communication with a plurality of sub-wavelength antenna elements. Further, the number, $N_m$, of port impedance vectors of the sequence is at least as large as a number of unknown admittance parameters, $N_u$, of an unknown admittance matrix. Thus, the sequence of port impedance vectors is $\{\vec{z}^{(m)}, m=1, \ldots, N_m\}$.

The calibration system may obtain S-parameters, $S^{(m)}$, of a scattering matrix, (S-Matrix), for each port impedance vector, $z^{(m)}$, of the sequence. The calibration system may include a tuner that applies the set of impedance values for the plurality of tunable impedance elements to the plurality of sub-wavelength antenna elements. The calibration system may also include a network analyzer that measures the at least one S-parameter for the applied set of impedance values for the plurality of tunable impedance elements.

The calibration system may generate a simulated S-Matrix by associating each of the port impedance vectors, $z^{(m)}$, with the unknown admittance matrix, Y, such that:

$$S^{sim}(\vec{z}^{(m)}, Y) = (1 - \sqrt{\vec{z}^{(m)}} Y \sqrt{\vec{z}^{(m)}})(1 + \sqrt{\vec{z}^{(m)}} Y \sqrt{\vec{z}^{(m)}})^{-1} \quad \text{Equation 1}$$

The calibration system may use Equation 1, or an equivalent expression, to determine a plurality of optimization variables by comparing each of the measured S-parameters, $S^{(m)}$, to the simulated S-Matrix for each port impedance vector, $z^{(m)}$. For example, the optimization variables may be solved using a least-squares analysis such that:

$$\min_Y \Sigma_{m=1}^{N_m} |S_{11}^{(m)} - S_{11}^{sim}(\vec{z}^{(m)}, Y)|^2 \quad \text{Equation 2}$$

Equation 2 may be solved using any of a wide variety of numerical solvers or other methods. The calibration system may generate an estimated admittance matrix by associating each of the optimization variables with the unknown admittance parameters.

The number of unknown admittance parameters, $N_u$, is $(N+1)*N/2$, where N corresponds to the number of tunable impedance elements plus the number of any input or output ports coupled to the antenna. As the number of unknown admittance parameters grows, Equation 2 becomes a larger optimization problem. The large optimization problem may require a significant and potentially limiting amount of processing power and time.

In some embodiments, to increase computational efficiency, only a subset of possible optimization variables is determined. For example, the calibration system may solve for the optimization variables that are associated with a diagonal value of the estimated admittance matrix, and neglect the off-diagonal values of the estimated admittance matrix. In some embodiments, the calibration system may create a hierarchy of admittance matrix variables based on their position in the estimated admittance matrix. For example, the admittance matrix variables along a diagonal of the estimated admittance matrix may be associated with a first tier.

In some embodiments, each admittance matrix variable is associated with a hierarchy tier based on a distance from the admittance matrix variable to a diagonal of the estimated admittance matrix. To estimate an admittance matrix accurately without solving for all of the optimization variables of Equation 2, the calibration system may only determine variables associated with certain tiers. For example, the calibration system may calculate a first subset of the least-squares optimization variables associated with the first tier. The calibration system may also calculate a second subset of least-squares optimization variables associated with a second tier. The calibration system may compare the first subset with the second subset to determine if the admittance matrix is within a target tolerance. The calibration system may determine that sufficiently accurate or "good" estimation may be obtained when the solved optimization variables for higher tiers yield rapid convergence (i.e., convergence to a sufficient tolerance in a predefined number of steps).

In some embodiments, to increase computational efficiency, a specially-selected sequence of impedance vectors is used. These impedance vectors are optimized to make the retrieval of admittance matrix variables faster and/or more reliable. For example, in one embodiment each port impedance vector in the sequence has no more than two non-zero values. In some embodiments, each port impedance vector has only two non-zero values that are equal to each other. In some embodiments, each impedance state has no more than two tunable impedance elements set to a maximum impedance value and all other tunable impedance elements are set to a minimum impedance value.

The calibration system may validate the estimated admittance matrix. To do this, the calibration system may generate a second sequence of port impedance vectors, ($z^{(m)(2)}$, m). Each of the port impedance vectors from the second sequence corresponds to a second set of impedance values for the plurality of tunable impedance elements. The calibration system may obtain at least one S-parameter, $S^{(m2)}$, of a second scattering matrix, (S-Matrix), for each port impedance vector in the second sequence of port impedance vectors by applying the second set of impedance values for the plurality of tunable impedance elements to the plurality of sub-wavelength antenna elements, and measuring the at least one S-parameter for the applied set of impedance values for the plurality of tunable impedance elements. The calibration system may determine a second plurality of optimization variables by comparing each of the S-parameters for the second set of unique impedance states to the simulated S-Matrix for each of the second port impedance vectors. The calibration system may generate a second estimated admittance matrix by associating each of the second plurality of optimization variables with an admittance matrix variable. Further, the calibration system may validate the estimated admittance matrix by comparing the estimated admittance matrix with the second estimated admittance matrix.

In some embodiments, to validate the estimated admittance matrix, the number of port impedance vectors in the second sequence of port impedance vectors is more than $N_m$. Also, the calibration system may modify the estimated admittance matrix based on the second plurality of optimization variables. Any of the various embodiments of the calibration system described herein may be included or coupled to a tunable antenna system. Furthermore, any of the various calibration methods described herein may be implemented by one or more processing units associated with a tunable antenna system.

Tunable antenna systems may include two-dimensional metasurface devices comprising an array of unit cells. Each unit cell may be modeled as a sub-wavelength antenna element associated with one or more tunable impedance elements. Each tunable impedance element may be associated with one or more sub-wavelength antenna elements. Each impedance element or group of impedance elements may be variably controlled based on one or more impedance control inputs. The tuning may be a one-time static tuning that is performed during the manufacturing of the antenna device, or the tuning may be a dynamic process that occurs during operation by modifying one or more control inputs.

Impedance control inputs may utilize the application of a direct current (DC) voltage to variably control the impedance of the tunable impedance element based on the magnitude of the applied DC voltage. In other embodiments, an impedance control input may utilize one or more of an electrical current input, a radiofrequency electromagnetic wave input, an optical radiation input, a thermal radiation input, a terahertz radiation input, an acoustic wave input, a phonon wave input, a mechanical pressure input, a mechanical contact input, a thermal conduction input, an electromagnetic input, an electrical impedance control input, and a mechanical switch input. In various embodiments, the tunable impedance elements may be modeled as two-port structures with an input and an output.

The tunable impedance elements of the antenna systems may comprise one or more of a resistor, a capacitor, an inductor, a varactor, a diode, a MEMS capacitor, a BST capacitor, a tunable ferroelectric capacitor, a tunable MEMS inductor, a pin diode, an adjustable resistor, an HEMT transistor, and/or another type of transistor. Any of a wide variety of alternative circuit components (whether in discrete or integrated form) may be part of a lumped impedance element. A tunable impedance element may comprise a liquid-crystal-filled tunable capacitor, a liquid-crystal-filled tunable resonator, a split ring resonator, an electric inductor-capacitor (ELC or electric-LC) resonator, a complementary split ring resonator, a tunable ferroelectric capacitor, a tunable MEMS inductor, and/or a complementary ELC resonator.

In some embodiments, at least one of the tunable impedance elements may comprise a memory element, such as a volatile or non-volatile memory element. A volatile memory element may include a transistor, a capacitor, and/or a flip-flop circuit. Volatile memory elements may be addressable using, for example, row and column addressing schemes.

Similarly, at least one of the tunable impedance elements may comprise a non-volatile memory element. The non-volatile memory element may include a floating-gate transistor, a non-volatile ferroelectric RAM element, and/or a non-volatile magnetoresistive RAM element. Non-volatile memory elements may be addressable using, for example, row and column addressing schemes.

One or more of the tunable impedance elements may be connected to and collocated with a tunable microelectronic circuit. In various embodiments, some of the lumped impedance elements are connected to and collocated with tunable microelectronic circuits addressable using a row and column addressing scheme. In some embodiments, one or more of the lumped impedance elements are connected to and collocated with a tunable microelectronic circuit located at the intersection of a word line and a bit line, and connected to both the word line and the bit line.

Some embodiments of the disclosure include calibration systems for antenna systems with tunable medium linear coders. Although the disclosure is generally described in terms of wireless communications (e.g., MIMO systems), the disclosure is not so limited. For example, embodiments of the disclosure also contemplate RADAR systems, wireless power systems, and any other systems where tunable medium linear coders would be helpful or desirable.

As used herein, the terms "coder," "precoder," and "decoder" refer to coding (i.e., precoding and/or decoding) for at least one of linear beamforming, radiation patterning, linear spatial diversity, and linear spatial multiplexing. This is in contrast to coders that perform time-domain analog modulation of signals for communication systems.

As used herein, the terms "beamforming" and "radiation patterning" refer to selectively (e.g., controllably) increasing signal power at one or more locations (e.g., locations of receiving antennas), decreasing signal power at one or more other locations (e.g., locations where there are not receiving antennas), or combinations thereof.

Embodiments may be understood by reference to the drawings, wherein like parts are designated by like numerals throughout. The components of the embodiments as generally described and illustrated in the figures herein can be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

FIG. 1 illustrates an antenna system comprising an array of sub-wavelength antenna elements 100, according to one simplified embodiment. The sub-wavelength antenna elements 100 may be associated with a plurality of variable or tunable impedance elements.

The array of sub-wavelength antenna elements 100 may form a two-dimensional array as illustrated, or may form a three-dimensional array. The lumped impedance elements may form any of a rectangular two-dimensional array, a square two-dimensional array, a triangular two-dimensional array, and a hexagonal two-dimensional array. The sub-wavelength antenna elements 100 may each have a maximum dimension that is less than half of a wavelength of the smallest frequency within an operating frequency range. One or more of the sub-wavelength antenna elements 100 may comprise a resonating element. In various embodiments, some or all of the sub-wavelength antenna elements 100 may comprise metamaterials. In other embodiments, an array of the sub-wavelength antenna elements (e.g., resonating elements) may collectively constitute a metamaterial.

The lumped impedance elements may also be configured as a concentric-circular array with elements aligned along concentric circles. In other embodiments, the lumped impedance elements form a concentric-circular array with elements aligned along radial lines from a common center.

FIG. 2A illustrates a conceptual model of an antenna system 200 showing a section of an array of sub-wavelength antenna elements 201 with associated variable lumped impedance elements, $z_n$, 203 according to a simplified embodiment. As previously described, the sub-wavelength antenna elements 201 may have inter-element spacings that are substantially less than a free-space wavelength corresponding to an operating frequency or frequency range of the antenna system 200. For example, the inter-element spacings may be less than one-half or one-quarter of the free-space operating wavelength.

As shown, each of the sub-wavelength antenna elements 201 is associated with at least one lumped impedance element 203. A common TL 205 may be coupled to the sub-wavelength antenna elements 201 via the lumped impedance elements 203 and may be modeled as another lumped impedance element or may be incorporated based on the effects of the TL 205 or other common waveguide on each of the lumped impedance elements 203. Each lumped impedance element 203 may have a variable impedance value that is set during manufacture or that can be dynamically tuned via one or more control inputs. The 1:1 ratio of lumped impedance elements 203 and sub-wavelength antenna elements 201 is merely exemplary and other ratios are possible.

The antenna system 200 need not be planar as illustrated in FIG. 2A, though it may be. In some embodiments, two groups of sub-wavelength antenna elements are coplanar with one another and at least one other group is non-coplanar with the first two coplanar groups.

Figure 2B:
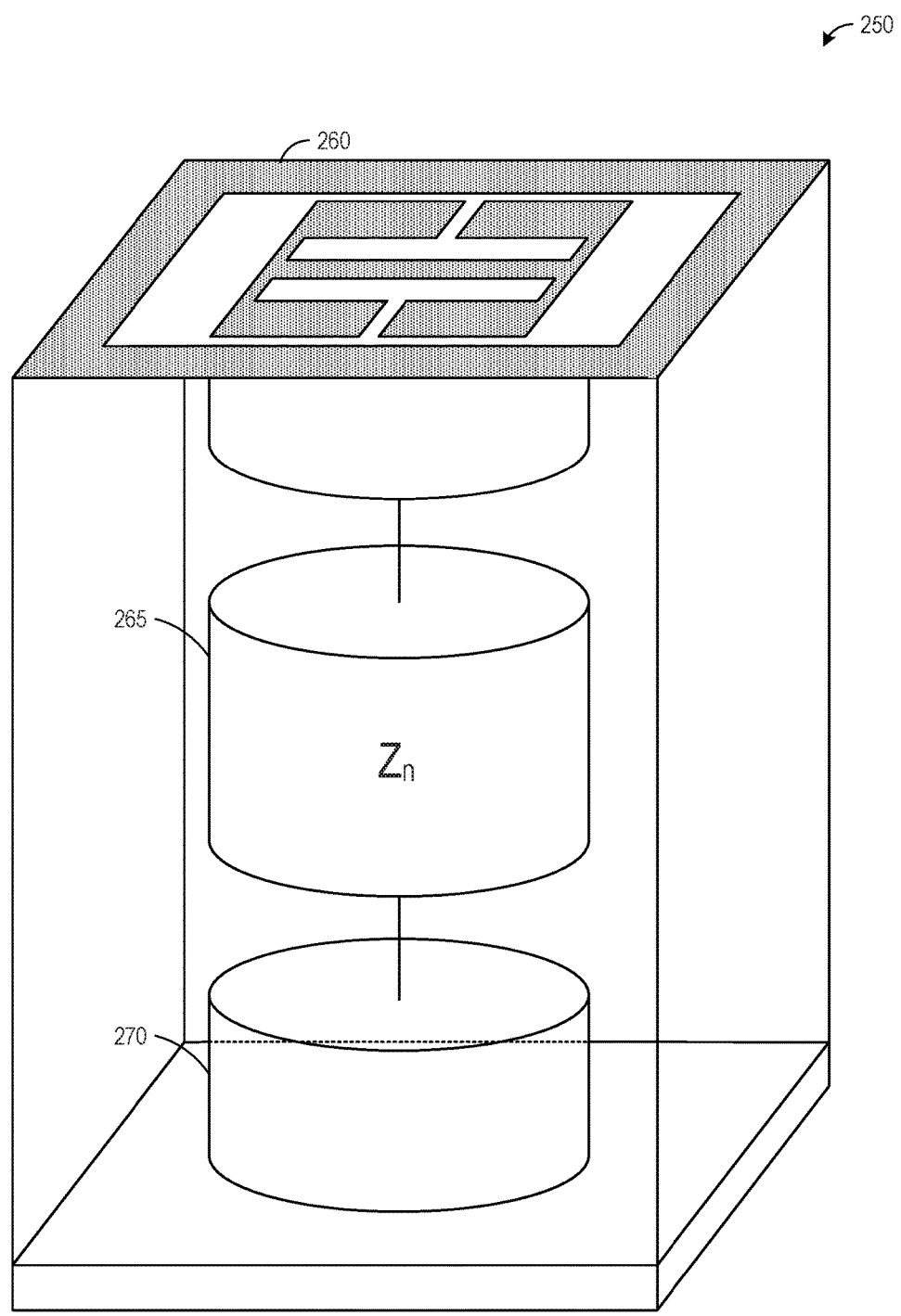
FIG. 2B illustrates a view of a conceptual model of a single sub-wavelength antenna element with an associated impedance element, according to one simplified embodiment.

FIG. 2B illustrates a close-up view 250 of a model of a single sub-wavelength antenna element 260 with an associated lumped impedance element, $z_n$, 265, and an impedance control input 270 that can be used to control or vary the impedance of the lumped impedance element, $z_n$, 265, according to one simplified embodiment.

The sub-wavelength antenna element 260 may be arranged in an array and may be configured for submersion in a fluid, such as fresh water, salt water, brackish water, or a particular gaseous environment.

Figure 3:
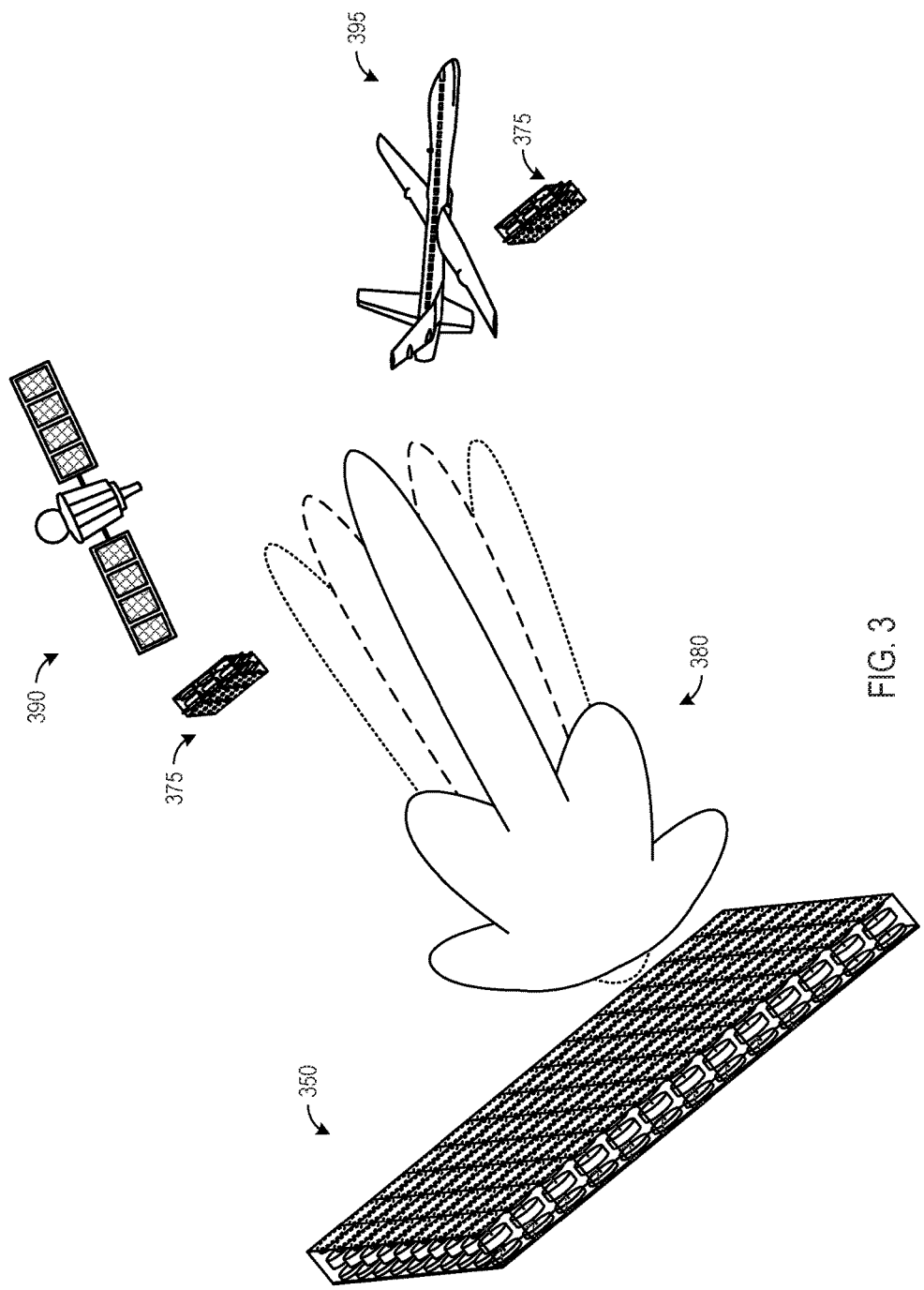
FIG. 3 graphically illustrates the results of adjusting one or more variable impedance control inputs to modify one or more impedance values of one or more of the variable impedance elements to attain a desired radiation pattern, according to one embodiment.

FIG. 3 graphically illustrates the results of adjusting one or more variable impedance control inputs to modify one or more impedance values of one or more of the variable lumped impedance elements associated with the sub-wavelength antenna elements of an antenna system 350 to attain a desired radiation pattern 380 (e.g., beamforming) based on the two lumped external ports, $N_e$, 375, and the associated targets 390 and 395. Efficient operation of the antenna system 350 relies on optimal spatial modulation patterns created by the sub-wavelength antenna elements. Techniques to generate optimal spatial modulation patterns rely on knowledge of the admittance matrix of the antenna system 350. To more accurately estimate the admittance matrix for precise beamforming, a calibration system (e.g., calibration system 402 in FIG. 4) may be used.

Figure 4:
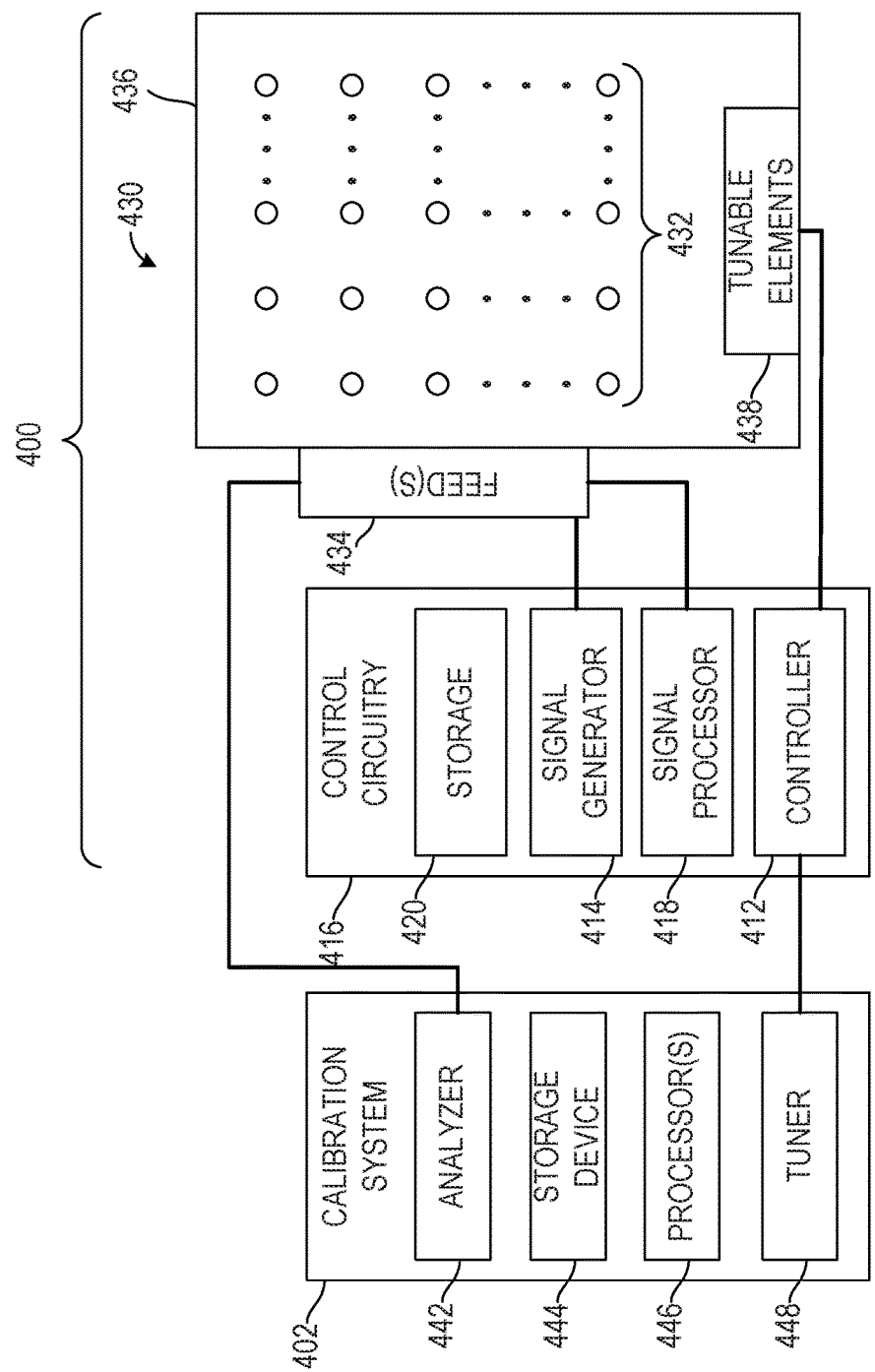
FIG. 4 illustrates a block diagram of a calibration system in communication with a tunable antenna system, according to one embodiment.

FIG. 4 illustrates a block diagram of a calibration system 402 in communication with a tunable antenna system 400 (hereinafter "antenna system" 400). The antenna system 400 may include a control circuitry 416 operably coupled to an antenna 430. The control circuitry 416 may be configured to modulate the antenna 430 between different states. The calibration system 402 may be configured to estimate the admittance matrix of the antenna system 400.

The antenna 430 may include a body 436 configured to propagate a reference wave (e.g., resulting from signals from a signal generator 414, and/or resulting from a radiative wave converted to the reference wave by the antenna 430). The body 436 may include any structure capable of propagating the reference wave (e.g., a guided wave, a surface wave, etc.). By way of non-limiting example, the body 436 may include a microstrip, a waveguide (e.g., coplanar, parallel plate, closed, tubular, other waveguides, and combinations thereof), a dielectric slab, other propagating structures, and combinations thereof. The body 436 may include a tunable impedance element network, a linear precoder, or a dynamic coded aperture.

The antenna 430 may also include one or more feed points 434 operably coupled to the body 436. The feeds 434 may be configured to conduct radio frequency (RF) signals between the control circuitry 416 and the body 436. In some embodiments, the feeds 434 may include RF connectors. By way of non-limiting example, the feeds 434 may include a coaxial-to-microstrip connector, a coaxial-to-waveguide connector, a mode-matched transition section, other connector, and combinations thereof. In some embodiments, the control circuitry 416 is coupled to an EM transceiver that propagates and receives signals through the body 436.

The antenna 430 may further include a plurality of discrete sub-wavelength antenna elements 432. In some embodiments, the sub-wavelength antenna elements 432 may be supported by the body 436 (e.g., on a surface of the body 436, in the body 436). In some embodiments, the sub-wavelength antenna elements 432 may be otherwise secured proximate to the body 436. The sub-wavelength antenna elements 432 may be arranged in rows or arbitrarily placed. The spacing between each of the sub-wavelength antenna elements 432 may be equal. Alternatively, in some embodiments, the spacing between each of the sub-wavelength antenna elements 432 may vary.

The sub-wavelength antenna elements 432 may be configured to scatter reference waves propagating through the body 436 to generate radiative waves that propagate through the air. Accordingly, the computing device 410 may transmit signals from the antenna 430 by providing transmit signals to the body 436 through the feeds 434, where the sub-wavelength antenna elements 432 may scatter the reference waves to generate the radiative waves. Also, the sub-wavelength antenna elements 432 may direct energy from radiative waves propagating through the air to generate reference waves propagating through the body 436. The device may receive signals via the feeds 434. As such, the antenna system 400 may function as a bi-directional communication device.

Each of the sub-wavelength antenna elements 432 may be configured to function individually in a plurality of different operational states responsive to control signals from a controller 412. In other words, electromagnetic properties of the sub-wavelength antenna elements 432 may be adjusted to be responsive to the control signals. For example, the sub-wavelength antenna elements 432 may include tunable impedance elements 438. When the control signal indicates a desired change in radiation patterning or operational state, the tunable impedance elements 438 may be adjusted to different states to accomplish the new radiation patterning.

In some embodiments, the plurality of different states of each sub-wavelength antenna element 432 may include only two states (i.e., the sub-wavelength antenna elements 432 function in a binary form). In some embodiments, the plurality of different states may include three or more discrete states (i.e., the sub-wavelength antenna elements 432 are grayscale elements). In some embodiments, the plurality of the sub-wavelength antenna elements 432 may be adjustable continuously over a continuum of operational states (in practice, however, if adjustment elements include digital to analog or analog to digital converters (DACs and ADCs, respectively), there may technically be a finite number of discrete operational states, depending on the resolution of the DACs/ADCs across the continuum).

The control circuitry 416 may include the controller 412, the signal generator 414, a signal processor 418, and storage 420. The signal generator 414 may be configured to generate transmit (Tx) signals that are delivered to the feeds 434 of the antenna 430 for conversion to radiative signals. The signal processor 418 may be configured to process receive (Rx) signals provided by the antenna 430.

The controller 412 may be configured to control the sub-wavelength antenna elements 432 to function in the plurality of different operational states (e.g., individually, as groups, etc.). The controller 412 may also be configured to modulate the sub-wavelength antenna elements 432 collectively in a plurality of different modulation patterns (e.g., two-dimensional modulation patterns). The plurality of different modulation patterns may include different permutations of the sub-wavelength antenna elements 432 operating in the plurality of different operational states. Different modulation patterns may change the radiation pattern of the antenna system 400.

One or more hardware, software, and/or firmware solutions may be employed to perform operations for beamforming. For instance, a computer-readable medium (e.g., a non-transitory computer-readable medium such as, for example, the storage 420) may have instructions that are executable by a processor (e.g., a processor 446) to form a specific coded aperture by controlling the impedance values of the lumped impedance elements via the tunable impedance elements 438. To create a proper aperture for a desired beam, the admittance matrix of the antenna 430 must be known. In some embodiments, the antenna system 400 may be simulated and the simulated admittance matrix stored on the storage 420. However, the simulated admittance matrix may not be accurate. For example, a manufacturing defect, environmental factors, and antenna damage may change the admittance matrix.

The calibration system 402 may estimate the admittance matrix based on actual measurements to correct for simulation errors. The calibration system 402 may include a network analyzer 442, a storage device 444, the processor 446, and a tuner 448. As shown, in some embodiments, the calibration system 402 may be an external device. In some embodiments, the calibration system 402 may be included in the control circuitry 416.

The signal analyzer 442 may measure the S-parameters of the feeds 434. The tuner 448 may provide the controller 412 with instructions to adjust the plurality of the tunable impedance elements 438. In some embodiments, the tuner 448 may provide control signals directly to the tunable impedance elements 438.

The storage device 444 may have instructions stored thereon that when executed by the processor 446 perform operations for estimating an admittance matrix. The processor 446 may generate a sequence of port impedance vectors, ($z^{(m)}$, m), detailing a set of impedance values for the plurality of the tunable impedance elements 438. The tuner 448 may instruct the controller 412 to sequentially apply each of the port impedance vectors. The network analyzer 442 may measure the S-parameter for the applied set of impedance values. Based on the measured S-parameters, the calibration system 402 may estimate the admittance matrix.

Any admittance matrix stored on the storage device 444 of the control circuitry 416 may be replaced with the new estimated admittance matrix. For example, if the admittance matrix was simulated prior to installation, the calibration system 402 may provide to the storage device 444 a more accurate admittance matrix after the install for optimum beamforming. As another example, a calibration system may operate at regular intervals (e.g., nightly, weekly, yearly) to update the stored admittance matrix. By calibrating at regular intervals, the admittance matrix may reflect deterioration of the antenna, damage to the antenna, or changes in environmental conditions.

In some embodiments, a sensor may initiate the calibration system. Some embodiments may use sensors to monitor antenna motion, debris impact, electrical surges, water intrusion, condensation build up, antenna temperature, and/or proximity of environmental structures. For example, a sensor on a satellite may detect debris impact and initiate the calibration process.

Figure 5:
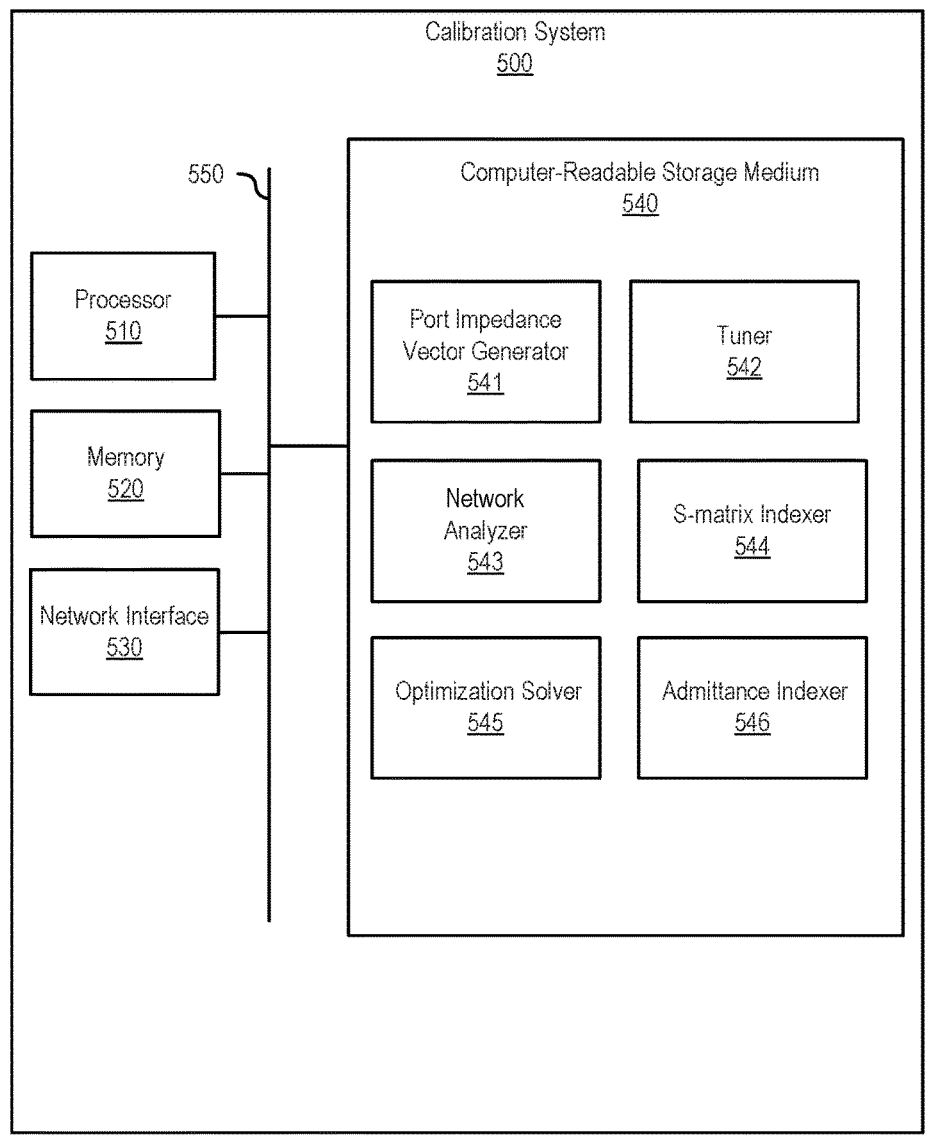
FIG. 5 is a functional block diagram of a calibration system for estimating an admittance matrix of a tunable antenna, according to one embodiment.

FIG. 5 is a functional block diagram of a calibration system 500 for estimating an admittance matrix of a tunable antenna, according to one embodiment. The calibration system 500 may include a processor 510, a memory 520, a network interface 530, and a computer-readable storage medium 540. A bus 550 may connect the processor 510 to the computer-readable storage medium 540, the memory 520, and the network interface 530.

The memory 520 may include a device configured to electronically store data (e.g., computer-readable instructions). For example, the memory 520 may be volatile data storage (e.g., random access memory (RAM)), non-volatile data storage (e.g., Flash memory, a hard drive, a solid state drive, electrically programmable read-only memory (EPROM)), other data storage, or combinations thereof.

The network interface 530 interconnects the calibration system 500 with external devices, systems, and networks. For example, the network interface 530 may communicatively couple the calibration system 500 to an antenna system. For instance, the network interface 530 may be in communication with antenna feeds, antenna tunable impedance elements, and/or controller circuitry. The network interface 530 may be configured to transmit and/or receive information by physical (wireline) and/or wireless communications links.

The computer-readable storage medium 540 may be a non-transitory device, according to one embodiment, and include any number of modules 541-546 for estimating an admittance matrix. In some embodiments, one or more of the modules 541-546 may be implemented in software, hardware, and/or firmware. In some embodiments, one or more of the modules 541-546 may be implemented in a cloud-based or remote location and interface via a communication interface, such as the network interface 530.

The computer-readable storage medium 540 is in communication with the processor through the bus 550. Each of the modules 541-546 provides instructions that when executed by the processor 510 cause the processor 510 to perform operations for estimating an admittance matrix. The modules 541-546 may include a port impedance vector generator 541, a tuner 542, a network analyzer 543, an S-Matrix indexer 544, an optimization solver 545, and an admittance indexer 546.

The port impedance vector generator 541 may generate a vector of sequence of port impedance vectors, ($z^{(m)}$, m). Each vector comprises a set of impedance values that describe a state for each tunable impedance element and port of a tunable metamaterial-based device. Thus, each vector maps out a desired modulation for the entire tunable metamaterial-based device.

For example, a typical tunable metamaterial-based device has one physical input port and a number (Nv) of tunable impedance elements. Because each of the tunable impedance elements may be represented mathematically by lumped ports with variable port impedances, together with the one physical input port, the tunable metamaterial-based device is described by an (Nv+1)-dimensional square matrix of S-parameters. Thus, in this example, each port impedance vector, $z^{(m)}$, of the sequence has a length, N, where N=Nv+1.

Further, the number, $N_m$, of port impedance vectors of the sequence is at least as large as a number of unknown admittance parameters, $N_u$, of an unknown admittance matrix such that $\vec{z}^{(m)}$, m=1, . . . , $N_m$. Since the number of unknown Y-parameters to be determined is Nu=(N+1)*N/2, the number of vectors to be measured $N_m$ has to be at least as large, for a reliable estimation to be possible. By measuring more numbers than the number of unknowns, the estimation becomes over determined resulting in a more accurate solution. Assuming that the metamaterial structure is sufficiently linear and reciprocal, the S-Matrix and Y-matrix are symmetric. Consequently, there are (N+1)*N/2 independent, complex values stored in these matrices.

The tuner 542 is configured to sequentially apply each of unique sequences to the tunable impedance elements. The tuner 542 may send a signal indicating the changes to the tunable impedance elements through the network interface 530. The network interface 530 may send the signal directly to the tunable metamaterial-based device or indirectly through control circuitry.

Measuring the Y-matrix and S-Matrix directly may be physically impossible. To measure each S-parameter would require physical access to each of the lumped ports, which may be intrusive or even require physical modification of the metamaterial structure. Therefore, the calibration system 500 is configured to measure the S-Matrix and admittance matrix of physically accessible ports.

The network analyzer 543 may measure the S-parameter for each sequence at one or more ports. For example, in embodiments with only one input port for the metamaterial structure, one complex value, S11, can be measured by the network analyzer 543. When the tuner 542 applies a new set of port impedance values, the network analyzer 543 measures S11 for that state. While this example illustrates an embodiment where only one port is measured, the network analyzer 543 may measure multiple ports for a more accurate estimation.

The S-Matrix indexer 544 may generate a simulated S-Matrix by associating each of the port impedance vectors, $z^{(m)}$, with the unknown admittance matrix. For example, the S-Matrix indexer 544 may associate the port impedance vectors, $z^{(m)}$, with the unknown admittance matrix as described by Equation 1.

The optimization solver 545 determines a plurality of optimization variables by comparing each of the measured S-parameters, $S^{(m)}$, to the simulated S-Matrix for each port impedance vector, $z^{(m)}$. For example, the optimization variables may be solved using a least-squares analysis as shown in Equation 2. The optimization solver 545 may use any known efficient numerical solver. The solution is the admittance matrix that matches all outputs of the tunable metamaterial-based device as accurately as possible. The admittance indexer 546 generates an estimated admittance matrix by associating each of the optimization variables with the unknown admittance parameters.

Figure 6:
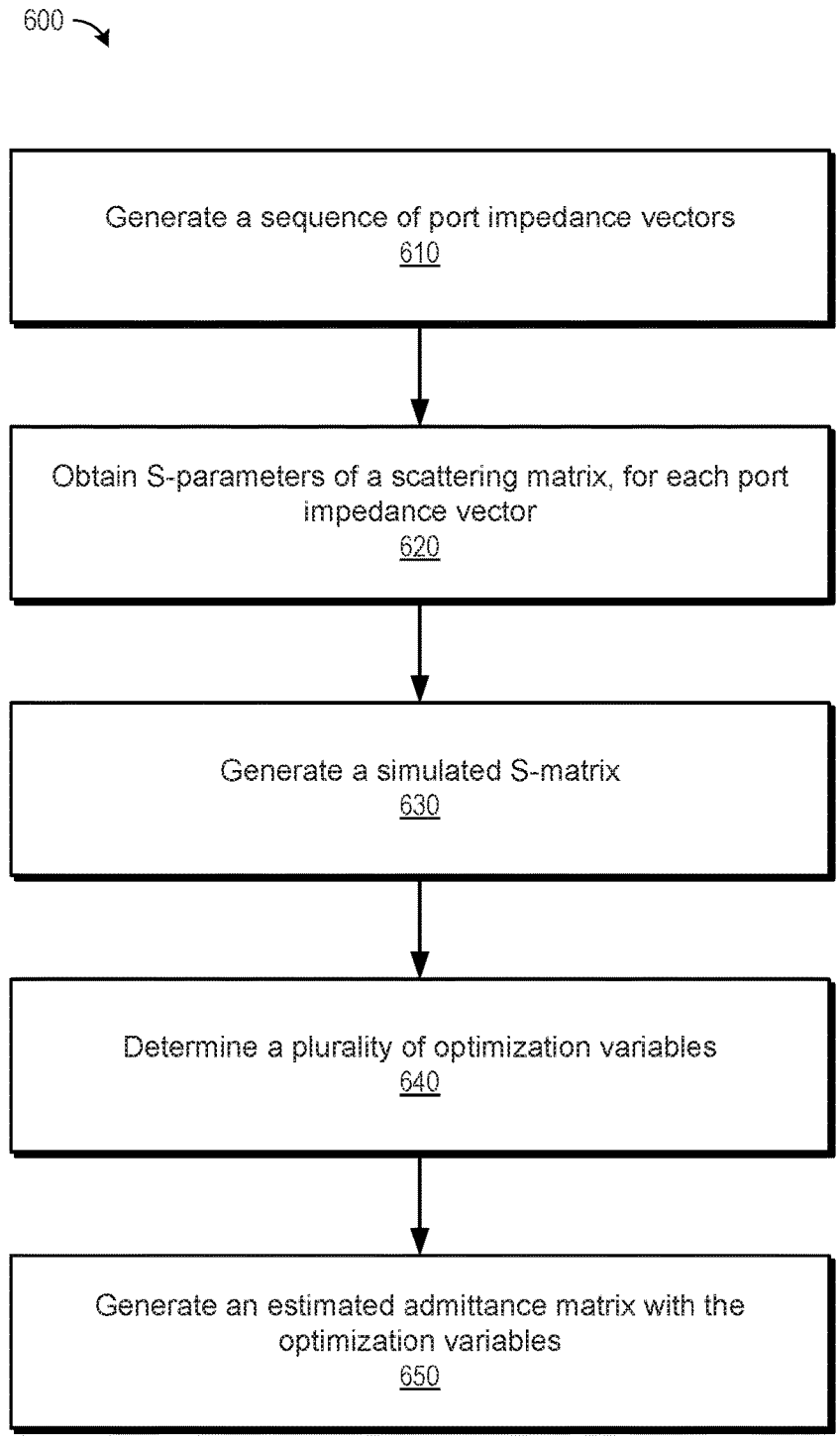
FIG. 6 is a flow chart of a method for estimating an admittance or impedance matrix of a tunable antenna, according to one embodiment.

FIG. 6 is a flow chart of a method 600 for estimating an admittance or impedance matrix of a tunable antenna, according to one embodiment. Many of the steps may be implemented in any order. However, as illustrated, a first step may include generating 610 a sequence of port impedance vectors, ($z^{(m)}$, m). Each port impedance vector, $z^{(m)}$, of the sequence may have a length, N, associated with the number of ports and tunable impedance elements. The vectors may specify modulation states for the tunable antenna. For example, the vectors may include a set of impedance values for a plurality of tunable impedance elements in communication with a plurality of sub-wavelength antenna elements on the tunable antenna. Further, the number, $N_m$, of port impedance vectors of the sequence may be at least as large as a number of unknown admittance parameters, $N_u$, of an unknown admittance matrix.

A vector network analyzer or similar system may obtain 620 S-parameters, $S^{(m)}$, of a scattering matrix, (S-Matrix), for each port impedance vector, $z^{(m)}$, of the sequence. The S-parameters, $S^{(m)}$, may be obtained by applying the set of impedance values of each sequence to the plurality of tunable impedance elements, and measuring the S-parameter for the applied set of impedance values.

Another step of the method 600 may include generating 630 a simulated S-Matrix. The simulated S-Matrix associates each of the port impedance vectors, $z^{(m)}$, with the unknown admittance matrix. For example, as shown in Equation 1, a simulated S-Matrix equation may be written for a given port impedance vector $\vec{z}^{(m)}$ and an unknown Y-matrix. An optimization analysis may determine 640 a plurality of optimization variables by comparing each of the S-parameters, $S^{(m)}$, to the simulated S-Matrix for each port impedance vector, $z^{(m)}$. For example, Equation 2 illustrates the use of a least-squares optimization analysis to solve for the unknown admittance matrix, Y. An estimated admittance matrix may be generated 650 by associating each of the optimization variables with the unknown admittance parameters.

Because Equation 2 is potentially a very large optimization problem, acceleration techniques may be used to reduce computation time. For example, FIGS. 7 and 8 illustrate two different classes of acceleration techniques that may be used alone or together.

FIG. 7 is a flow chart of a method 700 for accelerating the estimation of an admittance matrix of a tunable antenna using tiered matrices, according to one embodiment. A computation system that is solving Equation 2 may assign 710 hierarchy tiers to admittance matrix variables based on distance from a diagonal. One reasonable assumption about the unknown admittance matrix is that the off-diagonal values of this matrix are typically much smaller than the diagonal values. Therefore, as the admittance matrix variables become further from a diagonal the less effect they will have on antenna optimization.

The computation system may calculate 720 a first subset of the least-squares optimization variables associated with the first tier (e.g., a diagonal). A good initial estimate can be obtained by neglecting the off-diagonal values entirely. The initial estimate may provide a starting point for further optimization. For example, the computation system may calculate 730 a second subset of least-squares optimization variables associated with a second tier. This may be needed in embodiments where the off-diagonal admittance parameters corresponding to nearest-neighbor unit cells of the tunable metamaterial cannot be neglected.

However, off-diagonal values corresponding to coupling between more distant unit cells can be neglected. Thus, the computation system may determine 740 if the comparison reaches a target tolerance. When the comparison reaches a target tolerance progressively higher tiers may be neglected. If the comparison did not reach a target tolerance, a next set of variables may be calculated. An estimate reaches a target tolerance when an estimate yields rapid convergence (i.e., convergence to a sufficient tolerance in a certain, small number of steps). In multiple-processor, parallel-computing systems, multiple estimates with different tiers can be calculated in parallel, so that the procedure terminates when the fastest-converging parallel process reaches the target tolerance.

FIG. 8 is a flow chart of a method 800 for accelerating the estimation of an admittance matrix of a tunable antenna using specially selected impedance vectors, according to one embodiment. As illustrated, the method 800 to accelerate the admittance matrix may have an initial step of generating 810 a specially-selected sequence of impedance vectors.

In some embodiments the method 800 may use a sequence where each impedance vector has no more than two non-zero values, and zeros elsewhere. In some embodiments, the two non-zero values can be equal to each other. There are exactly $(N+1)*N/2$ vectors of length N with two non-zero values that equal to each other, where N is the number of ports and tunable impedance elements. Further, $(N+1)*N/2$ matches the minimum required number of measurements. Such a sequence includes exactly N vectors having only one non-zero number, and exactly $N(N-1)/2$ vectors having only two non-zero numbers; thus there are $N(N-1)/2+N=(N+1)N/2$ vectors total.

The remaining steps of obtaining 820 S-parameters, generating 830 a simulated S-Matrix, determining 840 optimization variables, and generating 850 an estimated admittance matrix remain the same as described with reference to FIG. 6. However, the importance of selecting the impedance vectors can be understood by considering that the inverse of Equation 2 effectively breaks down into many small problems by using a specially-selected sequence. For example, using a sequence where each impedance vector has no more than two non-zero values that can equal each other, all diagonal values of the admittance matrix may be determined instantaneously from a single measurement using a vector with only one non-zero element. Subsequently, each off-diagonal admittance element, $Y\_ij$, may be instantaneously determined from a single measurement where only the i-th and the j-th component of the z-vector are non-zero.

In some embodiments, the accessible range of tunable impedances in a metamaterial may not include the zero. A zero value of port impedance implies a perfect short, with zero resistance across the short. However, in some embodiments, there is always a minimal amount of impedance that cannot be eliminated. In these embodiments, a variant of the above method 800 may be used. For example, the port impedance vectors may have one or two impedances set to a maximum accessible value, and all other impedances set to a minimum accessible value. If the ratio of max/min impedances is sufficiently large, the use of such a sequence will result in a very reliable Y-matrix estimation. The use of such a sequence results in fully coupled Equation 2 of size $(N+1)N/2$ being transformed into a series of weakly-coupled problems of size 1 or 2.

The acceleration methods depicted in FIGS. 7 and 8 may be integrated with each other. For example, the sequence of impedance vectors can be selected as specified in FIG. 8, and various initial estimates for the admittance matrix may be generated using tiered approximations as described in FIG. 7.

Figure 9:
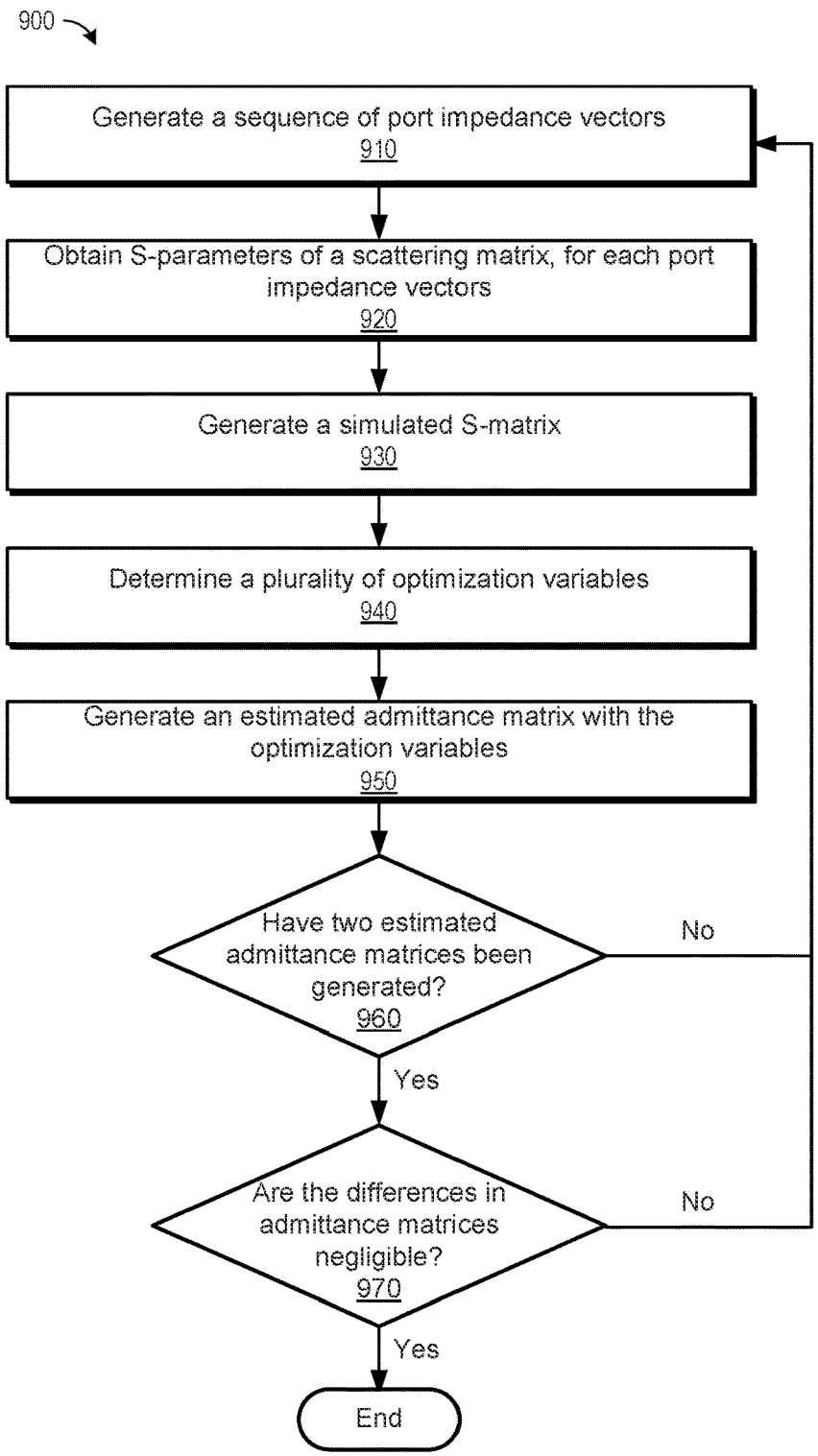
FIG. 9 is a flow chart of a method for validating an estimated admittance matrix using a second estimated admittance matrix, according to one embodiment.

FIG. 9 is a flow chart of a method 900 for validating an estimated admittance matrix using a second estimated admittance matrix, according to one embodiment. An estimated admittance matrix for a tunable impedance network may be generated by following steps 910-950. That is, a system may generate 910 a sequence of port impedance vectors, obtain 920 S-parameters for each vector, generate 930 a simulated S-Matrix, determine 940 optimization variables, and generate 950 an estimated admittance matrix with the optimization variables. These steps 910-950 are described in detail with reference to FIG. 6 steps 610-650. Further, the acceleration methods described with reference to FIGS. 7 and 8 may be used to simplify the calculations of these steps.

A second estimated admittance matrix may then be generated 960. The second estimated admittance matrix may be generated using a different sequence of port impedance vectors. In some embodiments, the second estimated admittance matrix may involve taking a larger set of measurements. The differences between the initial and second estimated admittance matrix are compared 970. If the differences in the admittance matrices are negligible, a reliable admittance matrix has been obtained. Otherwise, another estimated admittance matrix may be generated with an increased number of port impedance vectors and measurements.

Figure 10:
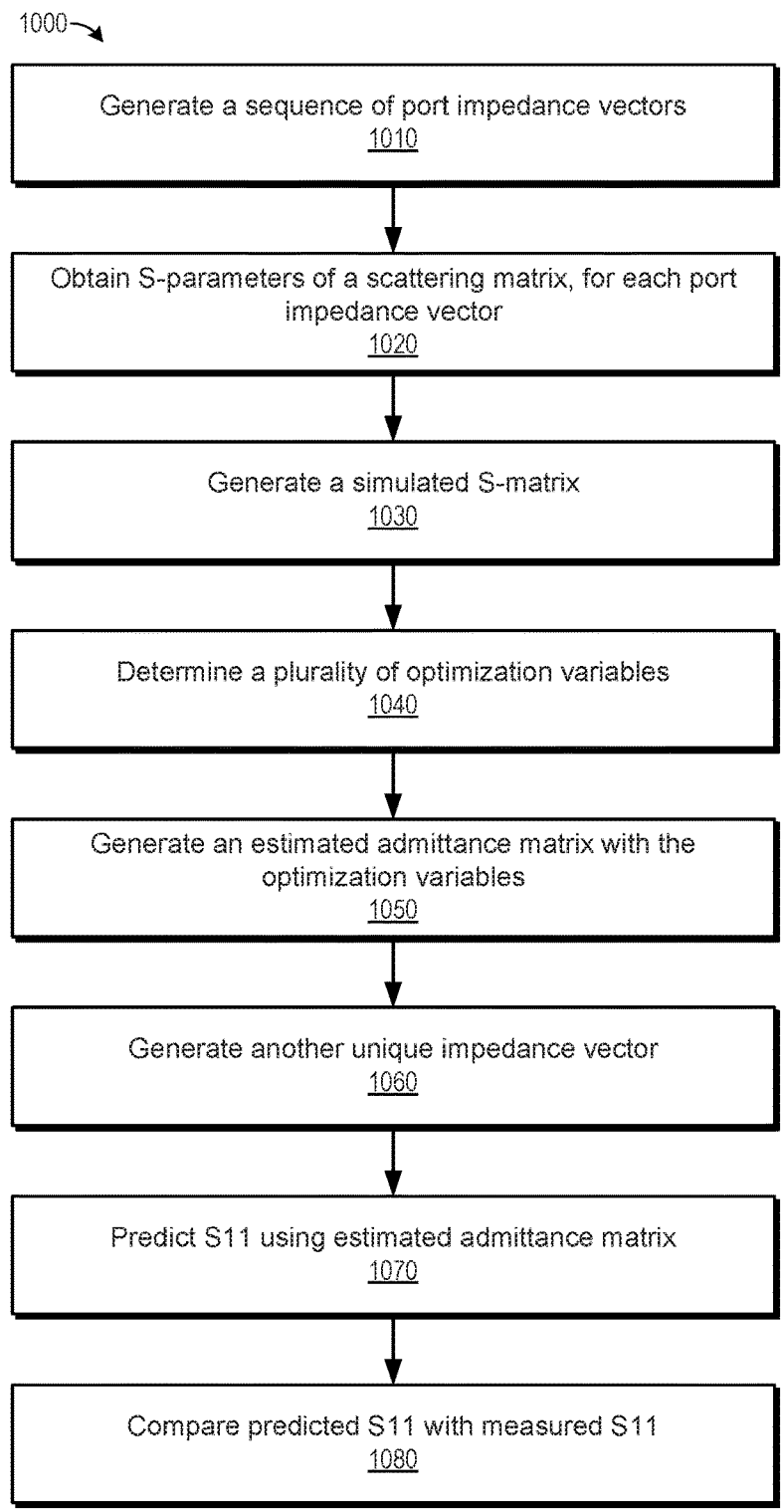
FIG. 10 is a flow chart of a method for validating an estimated admittance matrix of a tunable antenna, according to one embodiment.

FIG. 10 is a flow chart of a method 1000 for validating an estimated admittance matrix of a tunable antenna, according to one embodiment. An estimated admittance matrix for a tunable impedance network may be generated by following steps 1010-1050. That is, a system may generate 1010 a sequence of port impedance vectors, obtain 1020 S-parameters for each vector, generate 1030 a simulated S-Matrix, determine 1040 optimization variables, and generate 1050 an estimated admittance matrix with the optimization variables. These steps 1010-1050 are described in detail with reference to FIG. 6 steps 610-650. Further, the acceleration methods described with reference to FIGS. 7 and 8 may be used to simplify the calculations of these steps.

A system may generate 1060 another unique impedance vector. Using the estimated admittance matrix, the system may predict 1070 an S-parameter such as S11 for the unique impedance vector. The system may apply the unique impedance vector to the metamaterial device and measure the S-parameter. The system may then compare 1080 the predicted S-parameter with an actual measured S-parameter. If the differences are negligible, a reliable admittance matrix has been obtained. Otherwise, another estimated admittance matrix may be generated with an increased number of port impedance vectors and measurements.

Many existing computing devices and infrastructures may be used in combination with the presently described systems and methods. Some of the infrastructure that can be used with embodiments disclosed herein is already available, such as general-purpose computers, computer programming tools and techniques, digital storage media, and communication links. A computing device or controller may include a processor, such as a microprocessor, a microcontroller, logic circuitry, or the like.

A processor may include a special purpose processing device, such as application-specific integrated circuits (ASIC), programmable array logic (PAL), programmable logic array (PLA), programmable logic device (PLD), field programmable gate array (FPGA), or other customizable and/or programmable device. The computing device may also include a machine-readable storage device, such as non-volatile memory, static RAM, dynamic RAM, ROM, CD-ROM, disk, tape, magnetic, optical, flash memory, or other machine-readable storage medium. Various aspects of certain embodiments may be implemented using hardware, software, firmware, or a combination thereof.

The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In many instances, well-known structures, materials, or operations are not shown or described in detail to avoid obscuring aspects of this disclosure.

The embodiments of the systems and methods provided within this disclosure are not intended to limit the scope of the disclosure, but are merely representative of possible embodiments. In addition, the steps of a method do not necessarily need to be executed in any specific order, or even sequentially, nor do the steps need to be executed only once. As described above, descriptions and variations described in terms of transmitters are equally applicable to receivers, and vice versa.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims.

What is claimed is:

1. A method for estimating an admittance matrix of an antenna with a plurality of sub-wavelength antenna elements for radiation patterning, comprising:
    generating a sequence of port impedance vectors, $\{z^{(m)}, m=1, \ldots, N_m\}$, wherein each port impedance vector, $z^{(m)}$, of the sequence has a length, N, and corresponds to a set of impedance values for a plurality of tunable impedance elements in communication with a plurality of sub-wavelength antenna elements, and where a number, $N_m$, of port impedance vectors of the sequence is at least as large as a number of unknown admittance parameters, $N_u$, of an unknown admittance matrix;
    obtaining S-parameters, $S^{(m)}$, of a scattering matrix, (S-Matrix), for each port impedance vector, $z^{(m)}$, of the sequence by:
        applying the set of impedance values for the plurality of tunable impedance elements to the plurality of sub-wavelength antenna elements, and
        measuring at least one S-parameter for the applied set of impedance values for the plurality of tunable impedance elements;
    generating a simulated S-Matrix by associating each of the port impedance vectors, $z^{(m)}$, with the unknown admittance matrix;
    determining a plurality of optimization variables by comparing each of the S-parameters, $S^{(m)}$, to the simulated S-Matrix for each port impedance vector, $z^{(m)}$; and
    generating an estimated admittance matrix by associating each of the optimization variables with the unknown admittance parameters.

2. The method of claim 1, wherein the number of unknown admittance parameters, $N_u$, is $(N+1)*N/2$, where N corresponds to the number of tunable impedance elements and input ports coupled to the antenna.

3. The method of claim 1, further comprising:
    creating a hierarchy of admittance matrix variables based on their position in the estimated admittance matrix.

4. The method of claim 3, wherein the admittance matrix variables along a diagonal of the estimated admittance matrix are associated with a first tier, wherein each admittance matrix variable is associated with a hierarchy tier based on a distance from the admittance matrix variable to a diagonal of the estimated admittance matrix, the method further comprising:
    calculating a first subset of least-squares optimization variables associated with the first tier;
    calculating a second subset of least-squares optimization variables associated with a second tier;
    comparing the first subset with the second subset; and
    determining if the comparison reaches a target tolerance.

5. The method of claim 1, wherein each port impedance vector has no more than two non-zero values.

6. The method of claim 1, wherein impedance states corresponding to each port impedance vector have no more than two tunable impedance elements set to a maximum impedance value and all other tunable impedance elements set to a minimum impedance value.

7. The method of claim 1, further comprising:
    generating a second sequence of port impedance vectors, $\{z^{(m2)}, m2=1, \ldots, N_m^{(2)}\}$, wherein each of the port impedance vectors from the second sequence corresponds to a second set of impedance values for the plurality of tunable impedance elements and $N_m^{(2)}$ is a total number of port impedance vectors in the second sequence of port impedance vectors;
    obtaining at least one S-parameter, $S^{(m2)}$, of a second scattering matrix, (S-Matrix), for each port impedance vector in the second sequence of port impedance vectors by:
        applying the second set of impedance values for the plurality of tunable impedance elements to the plurality of sub-wavelength antenna elements, and
        measuring the at least one S-parameter for the applied set of impedance values for the plurality of tunable impedance elements;
    determining a second plurality of optimization variables by comparing each of the S-parameters for the second set of unique impedance vectors to the simulated S-Matrix;
    generating a second estimated admittance matrix by associating each of the second plurality of optimization variables with an admittance matrix variable; and
    validating the estimated admittance matrix by comparing the estimated admittance matrix with the second estimated admittance matrix.

8. The method of claim 1, wherein the optimization variables are determined using a least-squares analysis.

9. The method of claim 1, further comprising:
    generating a second sequence of port impedance vectors, $\{z^{(m2)}, m2=1, \ldots, N_m^{(2)}\}$, wherein each of the port impedance vectors from the second sequence corresponds to a second set of impedance values for the plurality of tunable impedance elements and $N_m^{(2)}$ is a total number of port impedance vectors in the second sequence of port impedance vectors;

obtaining at least one S-parameter, $S^{(m2)}$, of a second scattering matrix, (S-Matrix), for each port impedance vector in the second sequence of port impedance vectors by:
- applying the second set of impedance values for the plurality of tunable impedance elements to the plurality of sub-wavelength antenna elements, and
- measuring the at least one S-parameter for the applied set of impedance values for the plurality of tunable impedance elements;

determining a second plurality of optimization variables by comparing each of the S-parameters for the second set of unique impedance states to the simulated S-Matrix for each of the second port impedance vectors; and modifying the estimated admittance matrix based on the second plurality of optimization variables.

10. The method of claim 1, wherein at least some of the sub-wavelength antenna elements comprise resonating elements.

11. The method of claim 1, wherein each tunable impedance element is associated with a unique impedance control input, such that the impedance value of each tunable impedance element is independently variable.

12. The method of claim 1, wherein the impedance value of at least one of the tunable impedance elements is variable based on one or more electromagnetic impedance control inputs.

13. The method of claim 1, wherein the impedance value of at least one of the tunable impedance elements is variable based on one or more electrical impedance control inputs.

14. The method of claim 1, wherein the impedance value of at least one of the tunable impedance elements is variable based on one or more mechanical impedance control inputs.

15. A system for calibrating a tunable antenna, comprising:
- a network analyzer to analyze a port of an antenna with a plurality of sub-wavelength antenna elements;
- a tuner to selectively adjust a plurality of tunable impedance elements in communication with the plurality of sub-wavelength antenna elements
- a processor;
- a non-transitory computer-readable medium in communication with the processor, the non-transitory computer-readable medium providing instructions that when executed by the processor cause the processor to perform operations for estimating an admittance matrix, comprising:
  - generating a sequence of port impedance vectors, $\{z^{(m)}, m=1, \ldots, N_m\}$, wherein each port impedance vector of the sequence has a length, N, and corresponds to a set of impedance values for the plurality of tunable impedance elements in communication with the plurality of sub-wavelength antenna elements, where a number, $N_m$, of port impedance vectors of the sequence is at least as large as a number of unknown admittance parameters, $N_u$, of an unknown admittance matrix;
  - obtaining S-parameters, $S^{(m)}$, of a scattering matrix, (S-Matrix), for each port impedance vector, $z^{(m)}$, of the sequence by:
    - applying, via the tuner, the set of impedance values for the plurality of tunable impedance elements to the plurality of sub-wavelength antenna elements, and
    - measuring, via the network analyzer, the at least one S-parameter for the applied set of impedance values for the plurality of tunable impedance elements;
  - generating a simulated S-Matrix by associating each of the port impedance vectors, $z^{(m)}$, with the unknown admittance matrix;
  - determining a plurality of optimization variables by comparing each of the S-parameters, $S^{(m)}$, to the simulated S-Matrix for each port impedance vector, $z^{(m)}$; and
  - generating an estimated admittance matrix by associating each of the optimization variables with the unknown admittance parameters.

16. The system of claim 15, wherein the number of unknown admittance parameters, $N_u$, is $(N+1)*N/2$, where N corresponds to the number of tunable impedance elements and input ports coupled to the antenna.

17. The system of claim 15, wherein the operations further comprise:
creating a hierarchy of admittance matrix variables based on their position in the estimated admittance matrix.

18. The system of claim 17, wherein the admittance matrix variables along a diagonal of the estimated admittance matrix are associated with a first tier.

19. The system of claim 18, wherein each admittance matrix variable is associated with a hierarchy tier based on a distance from the admittance matrix variable to a diagonal of the estimated admittance matrix.

20. The system of claim 19, wherein the operations further comprise:
- calculating a first subset of least-squares optimization variables associated with the first tier;
- calculating a second subset of least-squares optimization variables associated with a second tier;
- comparing the first subset with the second subset; and
- determining if the comparison reaches a target tolerance.

21. The system of claim 15, wherein each port impedance vector has no more than two non-zero values.

22. The system of claim 21, wherein each port impedance vector has only two non-zero values that are equal to each other.

23. The system of claim 15, wherein impedance states corresponding to each port impedance vector have no more than two tunable impedance elements set to a maximum impedance value and all other tunable impedance elements set to a minimum impedance value.

24. The system of claim 15, wherein the operations further comprise:
- generating a second sequence of port impedance vectors, $\{z^{(m2)}, m2=1, \ldots, N_m^{(2)}\}$, wherein each of the port impedance vectors from the second sequence corresponds to a second set of impedance values for the plurality of tunable impedance elements and $N_m^{(2)}$ is a total number of port impedance vectors in the second sequence of port impedance vectors;
- obtaining at least one S-parameter, $S^{(m2)}$, of a second scattering matrix, (S-Matrix), for each port impedance vector in the second sequence of port impedance vectors by:
  - applying the second set of impedance values for the plurality of tunable impedance elements to the plurality of sub-wavelength antenna elements, and
  - measuring the at least one S-parameter for the applied set of impedance values for the plurality of tunable impedance elements;

determining a second plurality of optimization variables by comparing each of the S-parameters for the second set of unique impedance states to the simulated S-Matrix for each of the second port impedance vectors;

generating a second estimated admittance matrix by associating each of the second plurality of optimization variables with an admittance matrix variable; and validating the estimated admittance matrix by comparing the estimated admittance matrix with the second estimated admittance matrix.

25. The system of claim 24, wherein the number of port impedance vectors in the second sequence of port impedance vectors is more than $N_m$.

26. The system of claim 15, wherein the optimization variables are determined using a least-squares analysis.

27. The system of claim 15, wherein the operations further comprise:

generating a second sequence of port impedance vectors, $\{z^{(m2)}, m2=1 \ldots N_m^{(2)}\}$, wherein each of the port impedance vectors from the second sequence corresponds to a second set of impedance values for the plurality of tunable impedance elements and $N_m^{(2)}$ is a total number of port impedance vectors in the second sequence of port impedance vectors;

obtaining S-parameters, $S^{(m2)}$, of a second scattering matrix, (S-Matrix), for each port impedance vector in the second sequence of port impedance vectors by:

applying the second set of impedance values for the plurality of tunable impedance elements to the plurality of sub-wavelength antenna elements, and measuring the at least one S-parameter for the applied set of impedance values for the plurality of tunable impedance elements;

determining a second plurality of optimization variables by comparing each of the S-parameters for the second set of unique impedance states to the simulated S-Matrix for each of the second port impedance vectors; and modifying the estimated admittance matrix based on the second plurality of optimization variables.

28. The system of claim 15, wherein at least some of the sub-wavelength antenna elements comprise resonating elements.

29. The system of claim 15, wherein at least two of the sub-wavelength antenna elements comprise a metamaterial.

30. The system of claim 15, wherein each tunable impedance element is associated with a unique impedance control input, such that the impedance value of each tunable impedance element is independently variable.

31. The system of claim 30, wherein the impedance control input associated with at least one of the tunable impedance elements comprises a direct current (DC) voltage input, wherein the impedance value of the at least one tunable impedance element is based on the magnitude of the voltage supplied via the DC voltage input.

32. The system of claim 30, wherein the impedance control input associated with at least one of the tunable impedance elements can be varied to adjust the impedance value of the at least one tunable impedance element, wherein the impedance control input comprises one of: an electrical current input, an optical input, a thermal radiation input, an acoustic input, a phonon wave input, a thermal conduction input, and a mechanical switch input.

33. The system of claim 15, wherein the impedance value of at least one of the tunable impedance elements is variable based on one or more electromagnetic impedance control inputs.

34. The system of claim 15, wherein the impedance value of at least one of the tunable impedance elements is variable based on one or more electrical impedance control inputs.

35. The system of claim 15, wherein the impedance value of at least one of the tunable impedance elements is variable based on one or more mechanical impedance control inputs.

36. The system of claim 15, wherein at least one of the tunable impedance elements comprises one or more of a resistor, a capacitor, an inductor, a varactor, a diode, and a transistor.

37. The system of claim 15, wherein each of the sub-wavelength antenna elements has inter-element spacings substantially less than a free-space wavelength corresponding to an operating frequency.

38. The system of claim 37, wherein the operating frequency is a microwave frequency.

39. The system of claim 38, wherein the inter-element spacings are less than one-half of the free-space wavelength.

40. The system of claim 39, wherein the inter-element spacings are less than one-quarter of the free-space wavelength.

41. A non-transitory computer-readable medium with instructions stored thereon that, when executed by a processor, cause an antenna with a plurality of sub-wavelength antenna elements for radiation patterning to perform operations for estimating an admittance matrix, the operations comprising:

generating a sequence of port impedance vectors, $\{z^{(m)}, m=1, \ldots, N_m\}$, wherein each port impedance vector of the sequence has a length, N, and corresponds to a set of impedance values for a plurality of tunable impedance elements in communication with a plurality of sub-wavelength antenna elements, where a number, $N_m$, of port impedance vectors of the sequence is at least as large as a number of unknown admittance parameters, $N_u$, of an unknown admittance matrix obtaining S-parameters, $S^{(m)}$, of a scattering matrix, (S-Matrix), for each port impedance vector, $z^{(m)}$, of the sequence by:

applying the set of impedance values for the plurality of tunable impedance elements to the plurality of sub-wavelength antenna elements, and measuring the at least one S-parameter for the applied set of impedance values for the plurality of tunable impedance elements;

generating a simulated S-Matrix by associating each of the port impedance vectors, $z^{(m)}$, with the unknown admittance matrix;

determining a plurality of optimization variables by comparing each of the S-parameters, $S^{(m)}$, to the simulated S-Matrix for each port impedance vector, $z^{(m)}$; and generating an estimated admittance matrix by associating each of the optimization variables with the unknown admittance parameters.

* * * * *